Jan. 5, 1965 G. L. CLARK ETAL 3,164,778

LINEAR SWEEP CIRCUIT

Filed Aug. 21, 1961

GEORGE L. CLARK
JOHN J. HICKEY
*INVENTORS.*

BY Jerry A. Dinardo
George C. Thompson
AGENTS.

United States Patent Office 3,164,778

Patented Jan. 5, 1965

3,164,778
LINEAR SWEEP CIRCUIT

George L. Clark and John J. Hickey, Hawthorne, Calif., assignors, by mesne assignments, to Thompson Ramo Wooldridge Inc., Cleveland, Ohio, a corporation of Ohio Filed Aug. 21, 1961, Ser. No. 132,928
14 Claims. (Cl. 328—183)

This invention relates to sweep circuits, and more particularly to improvements in circuits capable of generating high voltage ramp waveforms of high linearity and of predetermined and variable time durations and slope.

In certain applications which utilize image tubes and cathode ray tubes of low deflection sensitivity, such as high speed electronic cameras and oscillographs, linear ramp or sawtooth waveforms are required which have excursions of several kilovolts. While there are known circuits for producing low voltage ramps, of the order of hundreds of volts, these circuits can not be used to generate ramp voltages having excursions of 3000 or more volts during time periods of the order of from one tenth to ten microseconds. Low voltage ramp waveforms produced by these circuits can not be readily amplified without introducing a high degree of nonlinearity.

Accordingly, an object of this invention is to provide a simplified variable slope, ramp voltage generator capable of providing linear sweep voltages of the order of several kilovolts.

A further object is to provide a simplified circuit for generating high voltage ramp waveforms of predetermined variable time duration and slope.

The foregoing and other objects are realized in a circuit in which the desired linear, high voltage ramp waveform is produced at the anode of a high voltage beam power tube which is used to discharge a capacitor connected to said anode. The beam power tube, which is normally biased to a nonconducting condition, is rendered conducting by the application to the control grid thereof of a fast rising step voltage pulse. Simultaneously with the application of the step voltage pulse, the screen grid is driven by a positive going linear ramp voltage. The effect of the linear ramp voltage applied to the screen grid is to maintain the plate current of the beam power tube constant as the capacitor discharges. Under these conditions, the anode voltage of the beam power tube drops at a linear rate to provide the desired ramp voltage.

Figure 1:
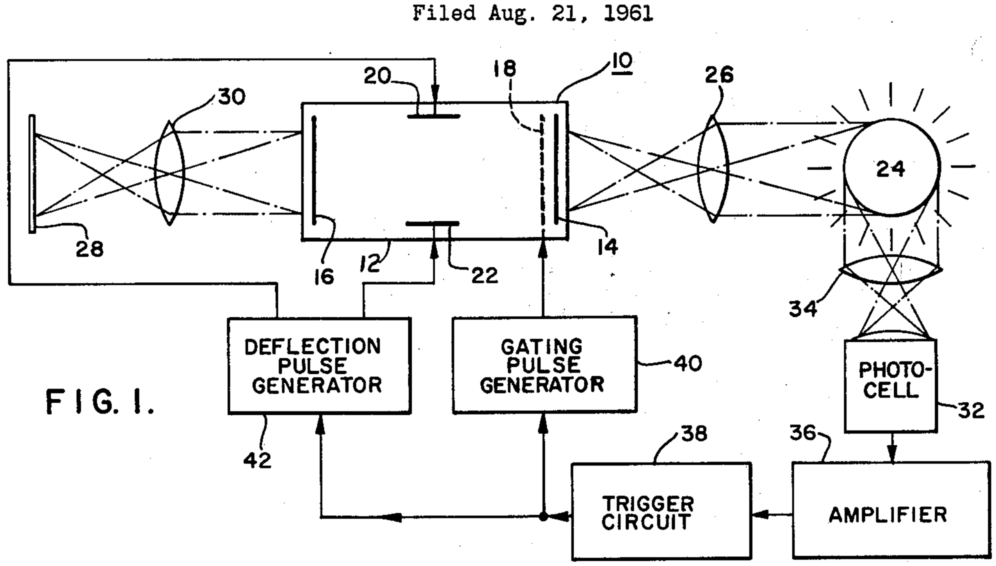
FIG. 1 is a block diagram of an electronic camera system in which the sweep circuit of the invention is used.

Referring now to the drawings in which like numerals refer to similar parts, FIG. 1 is a block diagram of an electronic camera system in which the improved thyratron trigger circuit of the invention finds particular utility. The electronic camera system includes as one of its principal components an image converted tube 10 which functions primarily as a high speed shutter. Another function of the image converter tube 10 is that of providing light amplification for the extremely short frame times involved in its high speed photographic operation.

The image converter tube 10 comprises essentially a cylindrical evacuated envelope 12 containing a photoemissive cathode or photo cathode 14 at one end, a fluorescent screen 16 at the other end, a control grid 18 adjacent to the photo cathode 14, and a pair of deflection plates 20 and 22 intermediate the control grid 18 and fluorescent screen 16. Certain other parts and components essential to the operation of the tube 10 are omitted for simplicity, since these are well known. For example, the tube 10 ordinarily contains additional electrodes such as an anode and focusing electrodes and also requires a high voltage supply. It will suffice to say that the tube may be one of the kind manufactured by RCA and bearing the developmental type number C73435A. It should be kept in mind that the voltage relationships of the elements are critical if a sharp focusing is desired.

It will be apparent that with an object 24 such as gas, heated to a temperature of millions of degrees, for a period of a few nanoseconds, the problem of obtaining desired data is acute. In the operation of the electronic camera for the purpose of photographing high speed transient phenomena, light from an object 24 is focused by a lens 26 onto the photoemissive cathode 14 of the image converter tube 10. The electron image emitted from the photo cathode 14 is normally prevented from reaching the fluorescent screen 16 by the application of a sufficiently high negative blanking voltage to the control grid 18 relative to the photo-cathode 14.

According to one mode of operation of the camera system, a rapid series of frames or exposures of the phenomina or object 24 can be taken by applying a series of rectangular gating voltage pulses to the control grid 18. The gating voltage pulses are sufficiently large, such as 300 volts, to unblank the control grid 18 and permit the electron image to be accelerated towards the fluorescent screen 16. The different frames or exposures may be reproduced side-by-side on the fluorescent screen by applying deflection voltages to the deflection plates 20 and 22 respectively, between and during successive gating pulses. The amplified light images appearing on the fluorescent screen are then projected onto a photographic film 28 by means of a lens system 30. In practice the film 28 may be part of a camera of the type which allows rapid development of the exposed film 28.

A trigger signal for actuating the electronic camera tube 10 is developed in a circuit which includes a photosensitive cell 32 exposed through a lens system 34 to the phenomenon or object 24 to be recorded. The beginning of the event, for example, may be manifested by the initial emission of light from the object 24. The light emission is picked up by the cell 32 where it is converted into an electrical impulse. The electrical impulse is amplified in an electrical amplifier stage 36 and the amplified impulse is fed to a thyratron trigger circuit 38 where it is further amplified and used to trigger a gating pulse generator 40 and a deflection pulse generator 42 to generate the gating and deflection pulses which are fed to the camera tube 10.

According to another mode of operation, a streak picture may be taken of the phenomenon by applying a linear sweep or ramp voltage to the deflection plates 20 and 22 while the control grid 18 is subjected to a gating pulse. Since the electron velocities in the camera tube 10 must be very high in order to obtain high resolution pictures of transient events occurring within periods as small as microseconds or less, the deflection sensitivity of the camera tube 10 is very low. Accordingly, very high sweep voltages are required on the deflection plates 20 and 22. Furthermore, the obtaining of most valuable data requires a precisely predetermined linear sweep voltage waveform so that the interrelation of phenomena occurring during separate small time intervals can be precisely determined.

Figures 2, 3:
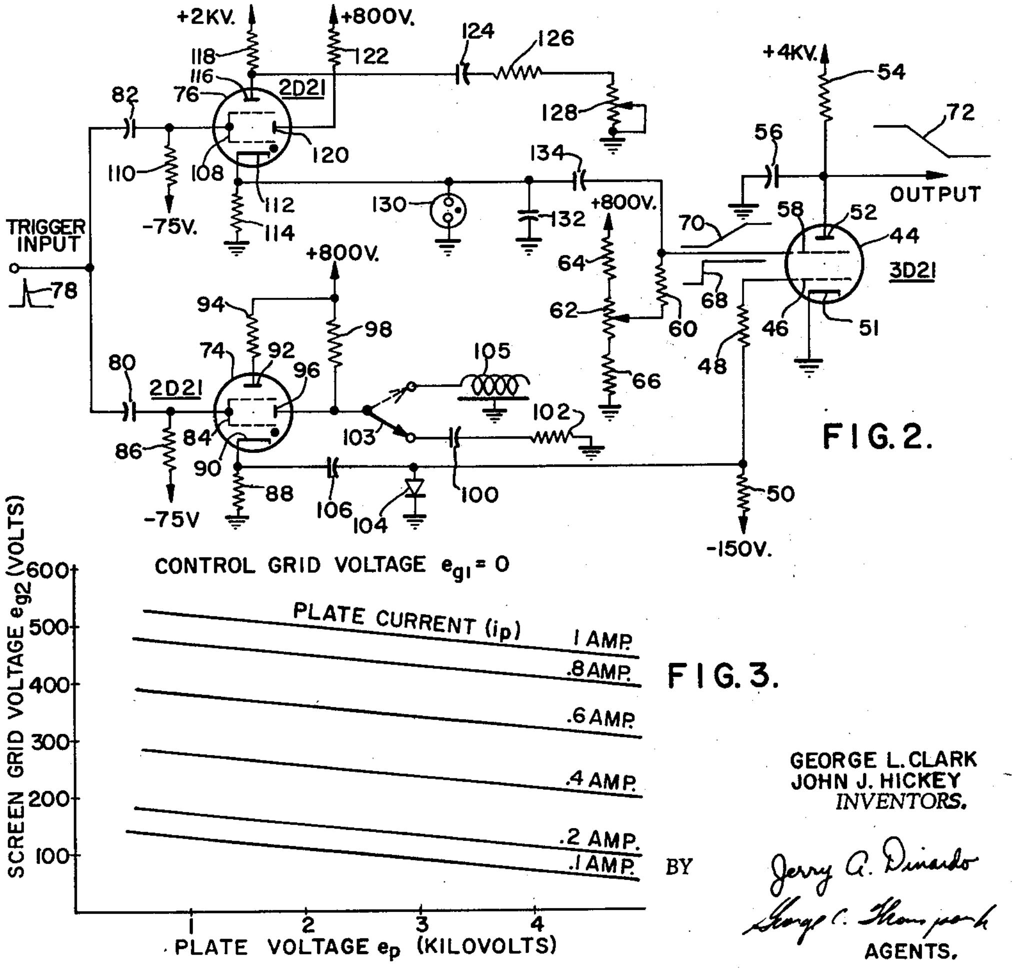
FIG. 2 is a schematic circuit of a high voltage linear sweep generator according to one embodiment of the invention.
FIG. 3 is a graph of characteristic curves of a sweep generator tube.

Reference is now made to FIG. 2 which illustrates an embodiment of a circuit for generating a high voltage linear ramp waveform according to the invention. The ramp voltage generator circuit may comprise the deflection pulse generator 42 of FIG. 1, for example. The circuit of the invention utilizes a high voltage beam power tube 44 to discharge a high voltage capacitor at a constant rate to generate the desired ramp voltage waveform. The beam power tube 44, for convenience termed the sweep generator tube, is normally maintained nonconducting by having its control grid 46 biased beyond cutoff by connection through bias resistors 48 and 50 to a negative bias voltage, the cathode 51 being grounded. An example of a suitable beam power tube is a type 3D21, and a suitable negative bias voltage is —150 volts. The anode 52 is connected through a plate resistor 54 to a positive high voltage anode supply of about 4 kilovolts. Between the anode 52 and ground is connected a high voltage capacitor 56, which is initially charged through the plate resistor 54 to the full anode supply voltage of 4 kilovolts. The screen grid 58 is maintained at a positive potential which may be varied from 0 to 800 volts, by connection to a voltage divider network through a screen resistor 60. The voltage divider network comprises a variable resistor 62 connected between two fixed resistors 64 and 66.

In accordance with the invention, the sweep generator tube 44 is driven to conduction to provide a constant current discharge path for the high voltage capacitor 56. This constant current discharge of the capacitor 56 assures a constant rate of change of voltage across the capacitor 56, in accordance with the following equation, $$\frac{de_p}{di}=-\frac{i_p}{C}=\text{constant}$$

where $$\frac{de_p}{dt}$$

is the time rate of change of the anode 52 voltage (also the voltage across the capacitor 56), $i_p$=the discharge current (also the plate current through the tube 44), and C is the capacitance of capacitor 56.

In order for the high voltage capacitor 56 to discharge at a constant rate and thereby provide a linearly decreasing output or ramp voltage at the anode 52, it is thus necessary to maintain constant current flow through the sweep generator tube 44. Under conditions of constant control grid 46 voltage and constant screen grid 58 voltage, the plate current through the sweep generator tube 44 would normally drop as the anode 52 voltage falls with the capacitor 56 voltage. Accordingly, the sweep generator tube 44 is driven to conduction by the application on its control grid 46 of a positive constant voltage pulse 68 of sufficient duration to keep the sweep generator tube 44 conducting for the required period of the sweep voltage. Simultaneously, the screen grid 58 is driven by a voltage waveform which maintains the plate current constant as the anode 52 voltage falls, to generate the desired high voltage output ramp waveform 72.

It should be pointed out that the sweep generator tube 44 does not function as an amplifier. Rather it functions as a variable resistance whose time variation is determined in advance to control a current in a desired manner.

The required input waveform 70 applied to the screen grid 58 in order to compensate for the normal drop in plate current with decreasing anode 52 voltage is determined by the shape of the tube characteristic curves. Reference is now made to FIG. 3, which represents the constant current characteristics of a 3D21 beam power tube under variable screen grid voltage $e_{g2}$ and zero control grid voltage $e_{g1}$ for different plate currents $i_p$. Similar curves are obtained for different control grid voltages. The constant current curves are seen to be nearly straight lines for this tube within a wide range of plate voltage $e_p$. This is, the screen grid voltage is a bias function of plate voltage. Since the plate voltage is required to be a linear function of time, it therefore follows that the screen grid voltage must be a linear function of time. Accordingly, a screen grid ramp voltage of the proper slope corresponding to the constant current curves and starting from the proper screen grid voltage may be used to maintain the tube current constant over a large range of plate voltages.

In accordance with the invention, two separate but concurrently controlled circuits are used to provide the necessary waveforms applied to the control grid 46 and screen grid 58 of the sweep generator tube 44. The first circuit that is used to generate either a positive rectangular pulse or step voltage 68 for driving the sweep generator tube 44 into conduction is built around a first thyratron tube 74, hereinafter called the sweep driver tube 74. The second circuit that is used to generate a low voltage input ramp waveform 70 for driving the screen grid 58 of the sweep generator tube 44 is built around a second thyratron tube 76, hereinafter called the linearity control tube 76. The sweep driver and linearity control tubes 74 and 76 are both fed a trigger pulse 78 from the trigger circuit 38 (FIG. 1) through coupling capacitors 80 and 82, respectively.

Both tubes 74 and 76 are normally biased to nonconduction by a negative voltage on each control grid. Referring to the sweep driver tube 74, it receives a negative bias voltage on its control grid 84 of 75 volts, for example, through a bias resistor 86. A load resistor 88 is connected between cathode 90 and ground. The secondary anode 92 is connected through one resistor 94 to a plate supply of 800 volts, and the primary anode 96 is connected through another resistor 98 to the same supply voltage. An energy storage means comprising a capacitor 100 and a resistor 102 are connected between the primary anode 96 and ground through a selector switch 103. Alternatively, the switch 103 may be moved to another position to connect the primary anode 96 to a delay line 105. With the capacitor 100 and resistor 102 in the circuit, a step voltage 68 is generated, and with the delay line 105 in the circuit a rectangular pulse is generated, the time duration of which is determined by the characteristics of the delay line 105.

During the nonconducting condition of the sweep driver tube 74, the capacitor 100 is charged to the full plate supply voltage of 800 volts. When the control grid 84 receives the trigger pulse, which, for example, may be a positive going pulse of 150 volts or more, the control grid 84 is quickly raised to cathode potential. Electrons emitted from the cathode 90 are exposed to the full high potential of the primary anode 96 and thus are quickly brought to the velocity of ionization of the gas molecules within the tube 74. The tube 74 is quickly switched to a conducting condition, whereupon the capacitor 100 is discharged through the circuit including the tube 74, the cathode load resistor 88 and the resistor 102. The flow of discharge current through the cathode load resistor 88 produces a sharply rising voltage pulse across the latter. While the resistors 88 and 102 are so proportioned that the cathode load resistor 88 would normally receive about 200 volts of the 800 volts originally appearing across the capacitor 100, the cathode 90 voltage is limited to 150 volts by a diode clipper 104 which is coupled to the cathode 90 through a coupling capacitor 106, the diode clipper 104 being negatively biased to 150 volts through the resistor 50. The output pulse appearing across the diode clipper 104 is fed to the control grid 46 of the sweep generator tube 44.

Referring to the linearity control tube 76, it is maintained normally nonconducting by a negative bias voltage on its control grid 108 of about 75 volts applied through a grid bias resistor 110, the cathode 112 being connected to ground through a cathode load resistor 114. The secondary anode 116 is maintained at a high positive potential by connection through a plate resistor 118 to a plate supply voltage of 2 kilovolts. The primary anode 120 is maintained at a lower positive potential by connection through a resistor 122 to a supply of about 800 volts. To the secondary anode 116 is connected a series circuit including a capacitor 124, a fixed resistor 126, and a variable resistor 128. In a shunt with the cathode load resistor 114 and with each other are connected a glow tube 130 and a capacitor 132. The cathode load resistor 114, the glow tube 130, and the capacitor 132 are coupled through a coupling capacitor 134 to the screen grid 58 of the sweep generator tube 44.

In the absence of a trigger pulse on the control grid 108 of the linearity control tube 76, the tube 76 is nonconducting and the capacitor 124 in the secondary anode 116 circuit is fully charged to the supply voltage of 2 kv. No voltage appears across the cathode resistor 114, the glow tube 130, and the shunt capacitor 132. When a trigger pulse is applied to the control grid 108 of the linearity control tube 76, it is quickly rendered conducting to provide a path including the linearity control tube 76, the series capacitor 124, the fixed resistor 126, the variable resistor 128, and the shunt capacitor 132, for the partial discharge of the capacitor 124 and the charging of the shunt capacitor 132. The values of resistor and capacitance in this circuit are such as to constitute a relatively long time constant circuit, so that the shunt capacitor 132 charges slowly according to an exponentially rising function. The glow tube 130, however, conducts when a relatively small portion of the rising voltage appears across the shunt capacitor 132, thereby cutting off any further rise in voltage across the shunt capacitor 132. Since the voltage rise across the shunt capacitor 132 is limited by the glow tube 130 to only a small initial portion of the exponentially rising waveform, this portion is substantially linear, thereby providing the desired linear low voltage input ramp waveform to the screen grid 58 of the sweep generator tube 44.

The slope of the low voltage input ramp waveform may be adjusted by varying the variable resistor 128 in the linearity control tube 76 circuit. The voltage on the screen grid 58 of the sweep generator tube 44 at which the input ramp voltage starts may be adjusted by varying the movable tap on the variable resistor 62. Accordingly, by varying the slope of the input ramp waveform to the sweep generator tube 44, together with the voltage at which the input ramp waveform starts, the slope of the high voltage ramp waveform at the output of the sweep generator tube 44 is correspondingly varied to produce a desired sweep speed in a utilization device, such as the image converter tube 10. There is only one combination of these two adjustments which will produce a given slope of the output ramp. However, with proper choice of resistors 62, 64, and 66 the two variable resistors 62 and 128 may be ganged together so that both the slope of the input ramp waveform and the screen grid 58 voltage at which the input ramp waveform is initiated may be controlled together to provide convenient variation in the slope of the output ramp waveform. The duration of the output ramp voltage may be varied by varying the length of the delay line 105 in the sweep driver tube 74 to vary the duration of the rectangular pulse generated therein.

It should be noted that fast switching speeds of the 2D21 thyratron tubes used for the linearity control and sweep driver tubes 76 and 74 can be realized when they are operated in a novel manner as shown in FIG. 2. The tubes 74 and 76 are preferably operated by utilizing as the control grid 84 or 108 the two part electrode which normally serves as the shield electrode, and by utilizing the primary anode 96 or 120 that element, disposed within the normal shield electrode, that is normally used as the control grid.

While it may be feasible to produce a linear sweep voltage by applying a single waveform to the control grid 46 of the sweep generator tube 44, it is found that a rather precisely shaped complex waveform is required. The waveform required is a trapezoidal pulse which must rise abruptly to turn the tube on, then rise linearly to maintain a constant plate current, and finally fall off to turn the tube off. The control grid voltage, however, has a much stronger effect on the plate current than the screen grid voltage so that the control grid voltage must be precisely governed to prevent unwanted variations in plate current. Thus, the trapezoidal waveform must be very precisely shaped and regulated. By separating the switching function from the plate current compensation function, according to the invention, two easily generated waveforms replace a single complex waveform that is hard to generate. The required accuracy of the control grid voltage is achieved by clipping the top of the step voltage or rectangular switching pulse applied to the control grid 46 of the sweep generator tube 44. The compensation necessary to maintain constant current is achieved by applying a relatively noncritical ramp waveform to the screen grid 58.

In accordance with an operative embodiment, the following circuit values were used:

| | | |
|---|---|---|
| Resistor 48 | ohms | 560 |
| Resistor 50 | | 100K |
| Resistor 54 | | 10M |
| Capacitor 56 | pf | 30 |
| Resistor 60 | | 10K |
| Resistor 62 | | 500K |
| Capacitor 80 | pf | 100 |
| Capacitor 82 | pf | 100 |
| Resistor 86 | | 10K |
| Resistor 88 | | 5.1K |
| Resistor 94 | | 10M |
| Resistor 98 | | 1M |
| Capacitor 100 | $\mu$f | .005 |
| Resistor 102 | | 15K |
| Capacitor 106 | $\mu$f | .01 |
| Resistor 110 | | 10K |
| Resistor 114 | | 100K |
| Resistor 118 | | 10M |
| Resistor 122 | | 1M |
| Capacitor 124 | $\mu$f | 0.1 |
| Resistor 126 | ohms | 100 |
| Resistor 128 | | 50K |
| Capacitor 132 | $\mu$f | .005 |

The embodiments of the invention in which an exclusive property or privilege is claimed are defined as follows:

1. A sweep generator circuit comprising: an electron discharge tube including a cathode, a control grid, a screen grid, and an anode; means connected between said anode and cathode for supplying an initial positive potential to said anode relative to said cathode; means connected between said screen grid and said cathode for supplying an initial positive potential to said screen grid relative to said cathode; means biasing said control grid to render said discharge tube nonconducting; a capacitor connected in shunt between said anode and said cathode; means for applying a rectangular voltage waveform to said control grid of sufficient magnitude to render said discharge tube conducting, whereby to discharge said capacitor through said discharge tube; and means for applying to said screen grid an additional voltage having a predetermined waveform calculated to maintain the current through said discharge tube substantially constant during the discharge of said capacitor, whereby the voltage on said capacitor discharges at a uniform rate to produce a linear output ramp voltage thereacross.

2. A sweep generator circuit comprising: an electron discharge tube including a cathode, a control grid, a screen grid, and an anode; a source of high positive potential connected to said anode; a source of positive potential connected to said screen grid; a bias source connected to said control grid to maintain said discharge tube normally nonconducting; a capacitor connected across said anode and said cathode and adapted to be charged to the potential of said anode during the nonconducting condition of said tube; means connected to apply to said control grid a rectangular voltage waveform of sufficient magnitude to drive said tube into conduction, whereby to initiate a discharge of said capacitor through said tube; and means connected to apply to said screen grid a positive linearly increasing voltage of a predetermined slope to render the current through said tube substantially constant during said capacitor discharge, whereby the voltage on said capacitor and anode falls at a constant rate to produce a high voltage linear sweep output.

3. A sweep generator circuit comprising: an electron discharge tube including a cathode, a control grid, a screen grid, and an anode; a source of high positive potential connected to said anode; a source of positive potential connected through a resistor to said screen grid; a bias source connected to said control grid to maintain said discharge tube normally nonconducting; a capacitor connected across said anode and said cathode and adapted to be charged to the potential of said anode during the nonconducting condition of said tube; means connected to apply to said control grid a voltage of rectangular waveform and of sufficient magnitude to drive said tube into conduction, whereby to initiate a discharge of said capacitor through said tube; and circuit means connected to apply to said screen grid a predetermined ramp voltage having an amplitude versus time characteristic matching the screen grid voltage versus plate voltage characteristic of said tube for constant control grid voltage and constant plate current conditions, to render the current through said tube substantially constant during said capacitor discharge, whereby the voltage on said capacitor and anode falls at a constant rate to produce a high voltage linear sweep output.

4. The invention according to claim 3 wherein said potential applied to said screen grid is derived from a source of variable voltage.

5. The invention according to claim 4 wherein said circuit means includes means for adjusting the slope of said ramp voltage applied to said screen grid to achieve a constant tube current condition.

6. A sweep generator circuit comprising: an electron discharge beam type tube including a cathode, a control grid, a screen grid, and an anode; means for applying an initial positive potential of several kilovolts to said anode; means for applying an initial positive potential of several hundred volts to said screen grid; means for biasing said control grid beyond the cutoff potential of said tube whereby to establish a nonconducting condition of said tube; a high voltage capacitor connected in shunt with said tube across said anode and said cathode, said capacitor being charged to the potential on said anode when said tube is nonconducting; a first circuit coupled to said control grid for generating and feeding to said control grid a voltage pulse of rectangular waveform and of sufficient magnitude to overcome the bias on said control grid and render said tube conducting; a second circuit coupled to said screen grid for generating and feeding to said screen grid a predetermined positive ramp voltage concurrent with said voltage pulse on said control grid, the slope of said ramp voltage being matched with the slope of the screen grid voltage versus plate voltage characteristic of said tube for constant grid voltage and constant plate current conditions to render the current through said tube substantially constant, thereby to discharge said capacitor at a uniform rate to produce a linear ramp voltage output at said anode.

7. The invention according to claim 6, wherein said first circuit includes means selectively operable to alter the duration of said constant amplitude voltage.

8. A sweep generator circuit comprising: an electron discharge beam type tube including a cathode, a control grid, a screen grid, and an anode; means for applying an initial positive potential of several kilovolts to said anode; means for applying an initial positive potential of several hundred volts to said screen grid; means for biasing said control grid beyond the cutoff potential of said tube whereby to establish a nonconducting condition of said tube; a high voltage capacitor connected in shunt with said tube across said anode and said cathode, said capacitor being charged to the potential on said anode when said tube is nonconducting; a first circuit coupled to said control grid for generating and feeding to said control grid a step voltage of sufficient magnitude to overcome the bias on said control grid and render said tube conducting; a second circuit coupled to said screen grid for generating and feeding to said screen grid a time varying voltage of predetermined waveform concurrent with said step voltage on said control grid, said predetermined waveform being matched to the screen grid voltage versus plate voltage characteristic of said tube for constant control grid voltage and constant plate current conditions, to render the current through said tube substantially constant, thereby to discharge said capacitor at a uniform rate to produce a linear ramp voltage output at said anode.

9. A sweep generator circuit comprising: an electron discharge tube including a cathode, a control grid, a screen grid, and an anode; means connected between said anode and cathode for initially supplying a relatively high positive potential to said anode with respect to said cathode; means connected between said screen grid and said cathode for maintaining supplying to said screen grid a positive potential relative to said cathode that is less than said potential between said anode and cathode; means biasing said control grid at a negative potential that is beyond the cutoff potential of said discharge tube; a capacitor connected a shunt between said anode and said cathode; means for applying a positive rectangular voltage pulse to said control grid of sufficient magnitude to render said discharge tube conducting whereby to discharge said capacitor through said discharge tube; and means for applying a predetermined positive going ramp voltage to said screen grid to maintain the current through said discharge tube substantially constant during the discharge of said capacitor whereby the voltage on said capacitor discharges at a uniform rate to produce a linear decreasing ramp voltage at said anode.

10. A sweep generator circuit comprising: an electron discharge tube including a cathode, a control grid, a screen grid, and an anode; a source of high positive potential connected through a resistor to said anode; a source of relatively low positive potential connected to said screen grid; a bias source connected to said control grid to maintain said discharge tube normally nonconducting; a capacitor connected in shunt across said anode and said cathode and adapted to be charged to the potential of said high potential source during the nonconducting condition of said tube; means connected to apply to said control grid a rectangular voltage pulse of sufficient magnitude to drive said control grid to the potential of said cathode, whereby to initiate a discharge of said capacitor through said tube; and means connected to apply to said screen grid a positive linearly increasing voltage of a predetermined slope to render the current through said tube substantially constant during said discharge, whereby the voltage on said capacitor and anode falls at a constant rate to produce a high voltage linear sweep output.

11. A sweep generator circuit comprising: an electron discharge beam type tube including a cathode, a control grid, a screen grid, and an anode; means for applying an initial positive potential of several kilovolts to said anode; means for applying an initial positive potential of several hundred volts to said screen grid; means for biasing said control grid beyond the cutoff potential of said tube whereby to establish a nonconducting condition of said tube; a high voltage capacitor connected in shunt with said tube across said anode and said cathode, said capacitor being charged to the potential on said anode when said tube is nonconducting; a first circuit coupled to said control grid for generating and feeding to said control grid a rectangular voltage of sufficient magnitude to overcome the bias on said control grid and render said tube conducting; a second circuit coupled to said screen grid for generating and feeding to said screen grid a positive ramp voltage concurrent with said voltage pulse on said control grid, said ramp voltage being of predetermined slope to render the current through said tube substantially constant, thereby to discharge said capacitor at a uniform rate to produce a linear ramp voltage output at said anode.

12. The invention according to claim 11, wherein said first circuit includes means selectively operable for causing either a rectangular voltage pulse or a step voltage to be generated therein.

13. The invention according to claim 11 wherein said initial potential appplied to said screen grid is derived from a source of variable voltage.

14. The invention according to claim 13 wherein said second circuit includes means for concurrently varying the slope of said ramp voltage applied to said screen grid with the potential applied from said variable voltage source.

References Cited in the file of this patent

UNITED STATES PATENTS

| | | |
|---|---|---|
| 2,180,365 | Norton | Nov. 21, 1939 |
| 2,476,978 | Hilton | July 26, 1949 |
| 2,508,879 | Zagor | May 23, 1950 |